(12) United States Patent
Sugawara et al.

(10) Patent No.: US 7,366,739 B2
(45) Date of Patent: Apr. 29, 2008

(54) DATA STORAGE SYSTEM

(75) Inventors: Hiroyuki Sugawara, Tokyo (JP); Junichi Kurihara, Kanagawa (JP)

(73) Assignee: Sony Corporation, Tokyo (JP)

( * ) Notice: Subject to any disclaimer, the term of this patent is extended or adjusted under 35 U.S.C. 154(b) by 382 days.

(21) Appl. No.: 10/638,988

(22) Filed: Aug. 12, 2003

(65) Prior Publication Data

US 2004/0098368 A1 May 20, 2004

(30) Foreign Application Priority Data

Aug. 14, 2002 (JP) ............................ P2002-236380

(51) Int. Cl.
*G06F 12/00* (2006.01)
*G06F 17/30* (2006.01)
(52) U.S. Cl. ............................ 707/201; 707/6; 707/10
(58) Field of Classification Search .................. 705/14; 707/500, 201, 6, 10; 709/247; 455/557
See application file for complete search history.

(56) References Cited

U.S. PATENT DOCUMENTS

| 5,911,776 | A | 6/1999 | Guck |
| 6,105,042 | A | 8/2000 | Aganovic et al. |
| 6,411,836 | B1 * | 6/2002 | Patel et al. .................. 600/407 |
| 6,993,476 | B1 * | 1/2006 | Dutta et al. ...................... 704/9 |
| 2001/0037241 | A1 * | 11/2001 | Puri ............................ 705/14 |
| 2001/0054114 | A1 * | 12/2001 | DuVal et al. ................ 709/247 |
| 2002/0073190 | A1 | 6/2002 | Munenáka et al. |
| 2002/0087345 | A1 * | 7/2002 | Bly et al. ....................... 705/1 |
| 2002/0103008 | A1 * | 8/2002 | Rahn et al. .................. 455/557 |
| 2003/0004984 | A1 * | 1/2003 | Chou .......................... 707/500 |

FOREIGN PATENT DOCUMENTS

| JP | 6-334658 | 12/1994 |
| JP | 9-185544 | 7/1997 |
| JP | 11-232299 | 8/1999 |
| JP | 2000-112805 | 4/2000 |
| JP | 2002-132566 | 5/2002 |

OTHER PUBLICATIONS

Eisaku Yamaguchi et al., "A proposal concerning a security manners of information in internet".

* cited by examiner

*Primary Examiner*—Tim Vo
*Assistant Examiner*—Jay A Morrison
(74) *Attorney, Agent, or Firm*—Frommer Lawrence & Haug LLP; William S. Frommer; Paul A. Levy

(57) ABSTRACT

A data storage system is disclosed having a plurality of terminal apparatuses of users connected with a data storage unit of a service provider via a computer network, the data storage unit storing data from inside the terminal apparatuses so that the stored data are subsequently used by the users. The data storage unit includes a connecting element, a file storing element, a file managing element, and a data format converting element. In response to a use request from any one of the users, the data format converting element converts stored data in the file storing element into a format compatible with the type of the terminal apparatus used by the requesting user for connection to the system. The converted data is used by the terminal apparatus through which the requesting user has sent the use request.

6 Claims, 7 Drawing Sheets

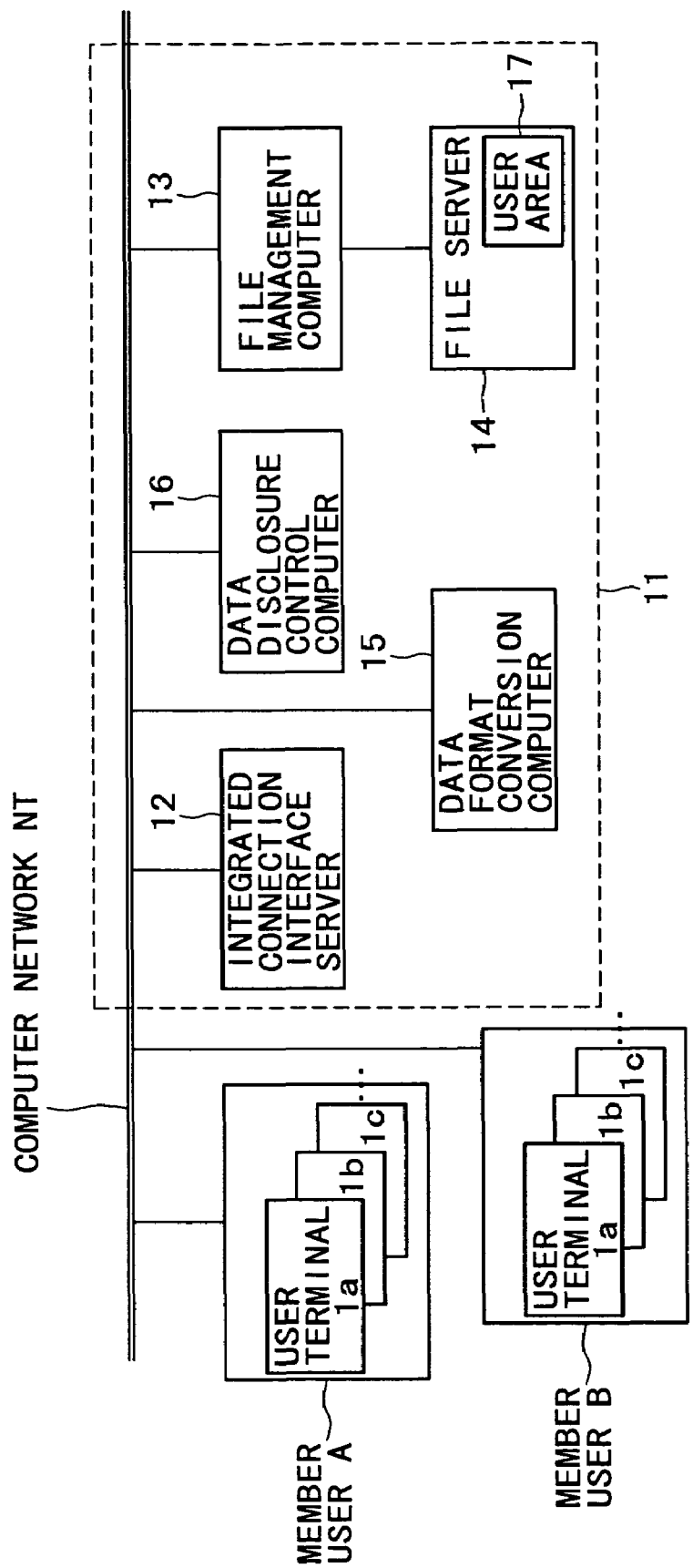

FIG. 2A

| USER ID | TOTAL SIZE | USED SIZE | REMAINING SIZE | USER AREA LOCATION |
|---|---|---|---|---|
| 001 | 1000 | 800 | 200 | /files/001 |
| 002 | 1000 | 1000 | 0 | /files/002 |
| 003 | 4000 | 2820 | 1180 | /files/003 |

FIG. 2B

| USER ID | FILE ID | GENRE | FILE SIZE | DATA FORMAT |
|---|---|---|---|---|
| 001 | Afo | Photo | 20 | FORMP3 |
| 001 | Bfo | Text | 15 | FORMT1 |
| 001 | Cfo | Movie | 100 | FORMM1 |

FIG. 3

| UNCONVERTED FORMAT | TYPE OF USER TERMINAL | CONVERTED FORMAT |
|---|---|---|
| FORM 1 | TERM 1 | FORM 11 |
| FORM 2 | TERM 1 | FORM 12 |
| FORM 3 | TERM 1 | FORM 13 |
| FORM 4 | TERM 1 | FORM 14 |

F I G. 4

| USER ID | FILE ID | AUTHORIZED USER ID | DISCLOSURE PERIOD | DOWNROAD | COPY | SECONDARY USE | FORMAT CONVERSION |
|---|---|---|---|---|---|---|---|
| 001 | Afo | 002 | 10 | 0 | 1 | 0 | 0 |
| 002 | Dfo | 001 | — | 1 | — | — | — |
| 003 | Efo | 001 | 30 | 0 | 1 | 1 | 1 |
| 003 | Efo | 002 | — | 0 | 0 | 0 | 0 |

FIG. 5

| OWN USER ID | ID OF USER FROM WHOM INFORMATION IS INTERCEPTED |
|---|---|
| 001 | 009 |
| 001 | 011 |
| 002 | 009 |

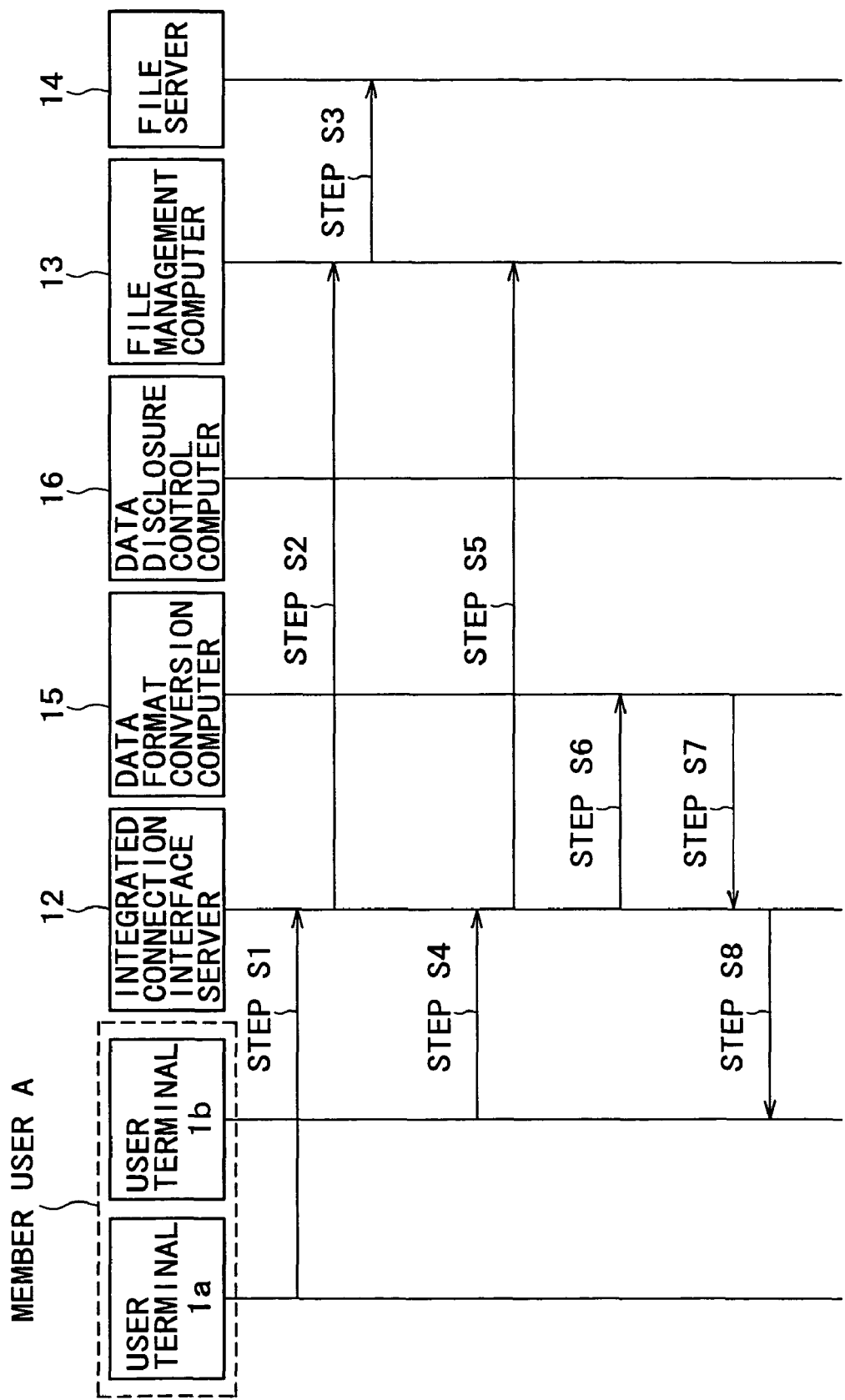

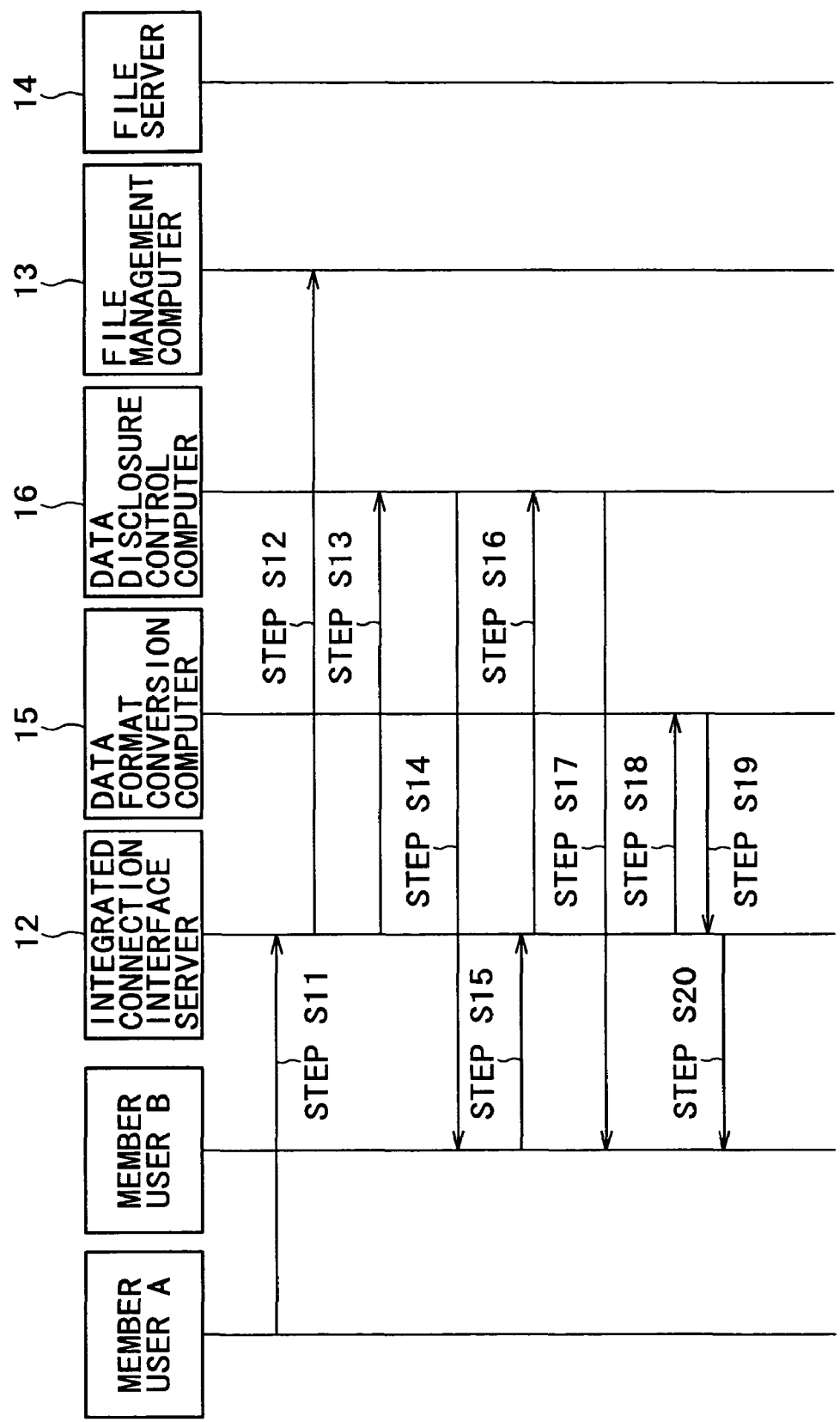

DATA STORAGE SYSTEM

BACKGROUND OF THE INVENTION

The present invention relates to a data storage system for causing a data storage apparatus on a network to store data from inside users' terminal apparatuses so as to let the stored data be subsequently used by the users. More particularly, the invention relates to a data storage system for allowing a plurality of types of terminal apparatuses to use data stored by the system.

In recent years, the so-called storage service has gained widespread acceptance. This is a service that enables terminal apparatuses such as personal computers (PCs) owned by users to transfer their electronic data files to a server for storage over a computer network. The storage service is being utilized for diverse purposes including data backup and disclosure. That is, copies of data files from inside users' computers are deposited with the storage service for subsequent uses by the users, or files transferred to the server are stored therein in formats allowing for download to the general public.

There have been a number of constraints on conventional storage services. For example, if a user transfers data from his or her personal computer at home to the server of a service provider for data storage, then the user will, upon retrieval, often have to access the server through the use of the same personal computer running the same application program in handling the data. In other words, the stored data cannot be shared between different types of apparatuses or between different applications even if the same apparatus is utilized. It follows that where the storage service is used for backup purposes, the user away from home cannot use the stored data using another personal computer or a PDA (Personal Digital Assistant) because the data were deposited using the PC at home. In a data disclosure setup, there is no way of knowing in advance the types of terminal apparatuses employed by users for access to the storage service system; if a terminal attempting to access the system is not among the types of the apparatuses that have been used to store the data, the user of that terminal is barred from the shared use of the data.

Conventionally, a person's electronic data files may be disclosed to others over the Internet by attaching the files to e-mail or Web mail for transmission, or by disclosing them at the person's own website or at a website run by a third party for disclosure purposes.

One disadvantage of the conventional scheme above is that where e-mail or Web mail is used, the disclosing party in possession of the electronic data files can disclose the files only to specific persons having an environment that permits the use of e-mail or like facilities. The files are limited to a predetermined data size. Another disadvantage is that once the files are sent out, there is no way of knowing how they will be handled by the receiving parties or what the files will be used for. Where the person's own website or a third party's website is utilized for data disclosure, it is difficult to disclose the files for specific persons only. Where the website is used for disclosure, the receiving parties are allowed to download electronic data files only as long as the files are being disclosed at the site.

Furthermore, where electronic data files are disclosed by e-mail, Web mail, or at the website, the data are encoded and decoded only for communication protocol and security purposes; the formats of the data files remain unconverted. This requires that the receiving parties procure terminal apparatuses and application programs compatible with the file formats offered by the disclosing party.

The present invention has been made in view of the above circumstances and provides a data storage system enabling a plurality of terminal apparatuses of users to share data deposited on the network by other users operating the same or other types of terminal apparatuses.

SUMMARY OF THE INVENTION

In carrying out the invention and according to one aspect thereof, there is provided a data storage system having a plurality of terminal apparatuses of users connected with a data storage unit of a service provider via a computer network, the data storage unit storing data from inside the terminal apparatuses so that the stored data are subsequently used by the users. The data storage unit includes a connecting element for connecting the data storage unit of the service provider with the terminal apparatuses of the users via the computer network independently of types of the terminal apparatuses, a file storing element for allocating to each of the users a user area of a predetermined size in which to store data from inside the terminal apparatus of the user in question, a file managing element for managing the data being stored in the file storing element, and a data format converting element for performing a data format converting process on the stored data in the file storing element. In response to a use request from any one of the users, the data format converting element converts stored data in the file storing element into a format compatible with the type of the terminal apparatus used by the requesting user for connection to the system. The converted data is used by the terminal apparatus through which the requesting user has sent the use request.

As outlined above, the data storage system of this invention allows users' terminal apparatuses to connect with the data storage unit of the service provider independently of the types of the terminal apparatuses being used. The data format converting element of the system converts the stored data in the file storing element into a format compatible with a particular type of the terminal apparatus used by each user for connection to the system. With the stored data converted to a suitable format as needed, each user can use the stored data using a terminal apparatus of a desired type for connection to the system.

Preferably, the data storage system of this invention may include a data disclosure controlling element for managing use conditions under which the stored data in the data storing element are allowed to be used. The data disclosure controlling element enables the data for which the use conditions have been set to be used by users other than the user who stored the data in question into the data storing element.

Thanks to these features of the inventive system, not only the user who stored data into the system but also other users can use the stored data using a desired terminal apparatus for connection to the system. The data is converted to the format compatible with the terminal apparatus that happens to be in use. In addition, where suitable use conditions are set for the data stored by a given user in the system, the stored data may be disclosed to other users in ways desired by the user in question. Specifically, the data may be offered or disclosed to particular users in a particular manner for particular purposes as designated by the user who stored the data.

BRIEF DESCRIPTION OF THE DRAWINGS

These and other objects of the invention will be seen by reference to the description, taken in connection with the accompanying drawing, in which:

FIG. 1 is a schematic view showing a typical configuration of a data storage system embodying this invention;

FIG. 2A is a tabular view depicting a typical member user management database;

FIG. 2B is a tabular view illustrating a typical member user file management database;

FIG. 3 is a tabular view indicating a typical data conversion table;

FIG. 4 is a tabular view presenting a typical disclosure policy management table;

FIG. 5 is a tabular view sketching a typical information intercepted member table;

FIG. 6 is a flowchart of steps in which the data storage system of the invention operates to let the same member user store and retrieve data; and FIG. 7 is a flowchart of steps in which inventive data storage system operates to let different member users share disclosed data.

DETAILED DESCRIPTION OF THE PREFERRED EMBODIMENTS

A preferred embodiment of the data storage system according to the invention will now be described in detail with reference to the accompanying drawings.

The inventive data storage system allows users to store data into a data storage unit of an entity that offers the system (called the service provider hereunder) and to manage the stored data as desired in order to let the data be subsequently referenced, downloaded, or otherwise used. Where this system is in operation, a contract made between each user and the service provider allocates to the user a user area of a predetermined size in which to store data inside a data storage device such as a server managed by the service provider (the user having a user area allocated under contract with the service provider will be called a member user hereunder). A member user may connect to the system through the computer network in order to move data from inside the user's terminal apparatus to the user area in the system for storage and to use the stored data as needed.

The above-described system uses an integrated connection interface for connection to the computer network. The interface allows diverse types of user terminal apparatuses to connect with the data storage unit of the service provider for data storage and other purposes.

The inventive system charges each member user for the size of the allocated user area. The user area may later be changed in its total size when relevant provisions of the contract are modified and agreed on between the user and the service provider.

Under this system, each member user makes a contract with the service provider over a data conversion service. This is a service which, when the member user attempts to use the data stored in the user area, converts the target data into a data format compatible with the type of the terminal apparatus used by the user in question for connection to the system. The data conversion service references format conversion data such as terminal-dependent data formats or file sizes recorded beforehand in the system when carrying out data format conversion processes converting one data format to another or changing the file size to comply with a given data format. Conversions may take place between such formats as GIF (Graphics Interchange Format), JPEG (Joint Photographic Coding Experts Group), AVI (Audio Visual Interleaved), and MPEG-4 (Moving Picture image coding Experts Group Layer 4). In the case that a plurality of data formats is compatible with a given terminal apparatus, the member user utilizing the terminal in question may select one of the formats for conversion.

In operation, the data conversion service automatically determines the type of the terminal apparatus used by the member user for connection to the system, and performs a data format conversion process in compliance with the automatically determined terminal type. The terminal type is determined illustratively by analyzing HTTT_USER-_AGENT of HTTP (HyperText Transfer Protocol) or equivalent information under a communication protocol in use, or by verifying the user ID, password, and destination of connection (i.e., URL) regarding the connected terminal apparatus of a given type.

Illustratively, a member user under contract may connect his or her Internet-capable personal computer to the system of the service provider, store data from inside the PC into the applicable user area in the system, and manage the stored data as desired. The data stored in the user area may later be referenced, downloaded, or otherwise used by a terminal apparatus other than the PC (e.g., a PDA, or a mobile telephone with communication capabilities) through the above-described data format conversion process ensuring compatibility with the terminal in use. Conversely, a terminal apparatus other than the personal computer may be used to connect to the system of the service provider and to deposit data with the system so that the stored data may subsequently be used by the PC. This feature provides member users with a higher degree of freedom in data utilization regardless of the type of the terminal apparatus used for connection to the system or the location where the connection is established with the system. Illustratively, a member user may operate a PC at home to store data into the system and the stored data in the system may later be accessed on the road using a PDA. By offering users flexible uses of the stored data based on enhanced system availability, this system enables the service provider to attract more customers than before.

The above-described data conversion service of the inventive system allows the user-deposited data to be not only utilized by the same user but also shared by different member users. Where appropriate provisions are included in the contract with the service provider over a data disclosure service, different member users may share the stored data. More specifically, the data stored by a given member user into the system may be disclosed in such a manner as to allow other member users to share the data as well (the other member users allowed to receive the disclosed data will be called receiving parties hereunder). Data files are disclosed using this system under what may be called a protected disclosure scheme. Under this scheme, member users willing to let their data be disclosed to and shared by other member users may impose certain use conditions on the disclosure (the member users disclosing their data will be called disclosing parties hereunder). The use conditions may illustratively involve: designating the receiving parties to whom data may be disclosed; authorizing or prohibiting a copy of the disclosed data to receiving parties' user areas; authorizing or prohibiting the download of the disclosed data to receiving parties' terminal apparatuses; specifying a period over which the data are disclosed; authorizing or prohibiting data format conversion to be performed by this system; and authorizing or prohibiting secondary use of the disclosed data (i.e., the practice of a receiving party authorizing other member users to use the received data). These use conditions will be referred to as disclosure policies in the description that follows. When a certain disclosing party authorizes disclosure of data to some other receiving party under the above-described constraints, the disclosure is first announced to the receiving party. The announcement is made illustratively by e-mail transmission or by a message indication on a display screen of the designated receiving party upon his or her connection to the system.

Following the announcement from the disclosing party, the receiving party is able to use the data stored in the disclosing party's user area. Because the data are disclosed by way of this system, the data are converted to a data format compatible with the type of the terminal apparatus used by the receiving party for connection to the system. The conversion process is the same as in the case of the same user storing and retrieving data to and from the system, unless data format conversion is explicitly prohibited as a disclosure policy. It follows that different member users, solely under constraints of the disclosing party's disclosure policy, can utilize the disclosed data in a flexible manner, i.e., regardless of the type of the terminal apparatus used for connection to the system or the location where the connection is established with the system.

The inventive system allows disclosing parties to grasp those who have used the disclosed data. In addition, the system preserves the settings of use conditions imposed by the disclosing parties on the disclosure and a history of uses by the receiving parties of the disclosed data. This feature also helps implement the protected data disclosure scheme.

Between different member users, whether or not to utilize disclosed data may be determined by each user. Each member user may also intercept the designation of disclosed data from a specific disclosing party. That is, the inventive system not only allows disclosing parties to stipulate their disclosure policies but also enables receiving parties to intercept unwanted disclosed data or announcements of such disclosure from particular disclosing parties as needed or in advance. This feature offers member users a further degree of freedom in choosing the data to make use of.

As outlined above, the system of this invention implements the protected data disclosure scheme under the disclosure policies stipulated by disclosing parties. The system thus allows member users to store and use their own data as well as share other members' disclosed data. Such enhanced availability of the system enables the service provider to attract more customers than before. By making a new contract with each member user over the data disclosure service, the service provider further gains usage fees for the service.

(1) Overall Configuration of the Data Storage System

Described below is a system configuration designed to implement the data storage system described above. FIG. 1 schematically shows an overall configuration of the data storage system according to the invention. In this setup, a plurality of user terminals $1a$, $1b$, $1c$, . . . (which will be generically called the user terminal 1 hereunder if there is no specific need for distinction therebetween) owned by users (A and B only in this example) are connected through a computer network NT such as the Internet to a data storage unit 11 of the service provider in possession of a plurality of servers and computers.

The users A and B are member users of the data storage system offered by the service provider. The user terminal $1a$ owned by each user is illustratively a consumer-oriented personal computer. The user terminal 1 or the PC includes: a CPU (Central Processing Unit) that performs various arithmetic operations while providing overall control on the terminal components; a RAM (Random Access Memory) acting as a work area for the CPU; a ROM (Read Only Memory) for accommodating data including programs executed by the CPU; a hard disc drive (HDD) on which an operating system and application programs run by the CPU are stored and to and from which varieties of data and files are written and read; a display unit for displaying diverse kinds of information; a display interface for interfacing data exchanges between the display unit and the CPU; an operation unit operated by the user entering data and instructions; an operation interface for interfacing data exchanges between the operation unit and the CPU; and a network interface for interfacing data and file exchanges between the terminal and the service provider over the computer network.

The user terminals $1b$ and $1c$ may each be a PC, a PDA, or a mobile telephone with communication capabilities. The user terminal 1 may be connected to the computer network NT either directly or by way of an Internet service provider (ISP) using a telephone line network or an optical fiber network. The user terminal 1 may be connected to the computer network NT in either wired or wireless fashion wherever the connection can be established. The user terminals $1a$, $1b$, and $1c$ are structured so as to communicate through the computer network NT with an integrated connection interface server of the data storage unit 11, to be described later.

The data storage unit 11 of the service provider has a plurality of computers and servers each having a structure similar to that of the user terminal 1. These computers and servers are furnished so as to implement the features necessary for the services to be provided. Specifically, the data storage unit 11 includes: an integrated connection interface server 12 for interfacing with member users; a file management computer 13 that records and manages information about member users and about data files stored by the member users; a file server 14 for storing actual data from each member user; a data format conversion computer 15 that performs data conversion processes on the stored data files; and a data disclosure control computer 16 that records and manages information about the disclosure policies stipulated by member users.

The integrated connection interface server 12 is a server that includes Web server capabilities. The integrated connection interface server 12 also has a function that automatically determines the type of the user terminal 1 employed by the user for connection to the system before establishing communications compatible with the terminal type. Given instructions over the computer network NT from the user terminal 1 about the storage or disclosure of data files, the integrated connection interface server 12 instructs the computers and servers inside the data storage unit 11 to proceed with their operations accordingly. On receiving the results of the operations by the computers and servers in the data storage unit 11, the server 12 transfers the received results to the user terminal 1.

The integrated connection interface server 12 determines the type of the user terminal 1 illustratively by establishing a URL for each of the different types of terminals to connect with the system. This function is implemented through the use of a plurality of interface servers each having a terminal-dependent interface capability, assisted by an integrating server that integrates connections to these servers.

The file management computer 13 connected to the computer network NT records and manages attribute information about member users and about member users' stored data files, in database formats as shown in FIGS. 2A and 2B. FIG. 2A depicts a typical member user management database containing attribute information about each member user, such as a user ID, total sizes of the user area (to be discussed later), a used size of the user area, remaining sizes of the user area, and a user area location in the storage area. FIG. 2B illustrates a typical member user file management database retaining a user ID, a file ID, a genre, a file size, and a data format about each data file stored by each member user (member user 001 in this example).

Each user ID included in the member user management database is an identifier made up of a number, a symbol, characters, or the like designed to identify each member user. Illustratively, a user ID is given to the user who has entered into a contract with the service provider. In the member user file management database, the file ID represents an identifier for identifying a stored data file; the genre stands for a predetermined category to which a data file of specific contents is deemed to belong; the file size denotes the size of a data file; and the data format is the format of a data file in effect when the file in question was stored by a member user.

The file management computer 13 receives from the user terminal 1 requests to save, delete, search for, and move data files through the integrated connection interface server 12. Given such a request from a member user, the file management computer 13 updates those data items in the applicable database, which are needed to manage illustratively the used size of the user area and an available file list for the member user in question. The file management computer 13 then instructs the file server 14 to store actual data.

The file server 14 is connected to the computer network NT, and has a user area 17 allocated inside for each member user under contract with the service provider. In this example, a total available size for each user is determined in the file server 14 according to the contract made between the user in question and the service provider. Once the total available size is fixed, the location of the storage area for the user is determined accordingly as the user area 17. The user area 17 may be changed in terms of contract period, total available size, or the like, when relevant provisions of the contract are modified and agreed on between the user and the service provider.

Under the instruction of the file management computer 14, the user area 17 allocated in the file server 14 stores actual data of the data file whose storage has been designated from the user terminal 1 of a given member user. In order to accommodate large quantities of data files sent from member users, the file server 14 is constituted by a mass storage device.

The data format conversion computer 15 is connected to the computer network NT. The computer 15 performs a data format conversion process on a designated data file held in the file server 14 in response to a data use request issued by a member user through the integrated connection interface server 12, or more specifically in accordance with the instruction from a terminal apparatus different from the user terminal used earlier by the user to store the data file in question. The data format conversion process is carried out illustratively on the basis of a data conversion table such as that shown in FIG. 3. For example, if a request to use a data file stored earlier in a format called "FORM1" is issued by a user terminal 1 of a type called "TERM1," then the data format conversion computer 15 may convert the data file in question into a format called "FORM11." The data format conversion may occur illustratively from GIF to JPEG, from GIF (of a desired picture size) to GIF (picture size of N[pixels]×M[pixels]), from AVI to MPEG-4, or HTML (HyperText Markup Language) to text. The data format conversion computer 15 also converts one file size to another to comply with the type of the user terminal being used.

The data disclosure control computer 16 is also connected to the computer network NT, and receives instructions through the integrated connection interface server 12 about the disclosure of data files to other member users. The disclosure policies included in such instructions are managed illustratively by creating a disclosure policy management table such as that shown in FIG. 4. In the disclosure policy management table of FIG. 4, a "0" stands for prohibition and a "1" for authorization. For example, as shown in FIG. 4, a member user 001 disclosing a data file "Afo" authorizes another member user 002 to copy the file "Afo" into the user area 17, but prohibits the user 002 from downloading the data file to any other terminal apparatus, from making any secondary use of the copied file, and from getting data format conversion carried out on the data file in question. The member user 002 disclosing a data file "Dfo" authorizes the member user 001 to download the file "Dfo" to the user 001's terminal apparatus. A member user 003 disclosing a data file "Efo" authorizes the member user 001 to copy the file "Efo" to the user 001's user area 17 and grants the user 001 a secondary use of the copied file as well as data format conversion of the data file. The member user 003 denies the user 002 the copy, secondary use, and data format conversion of the data file "Efo"; the member user 003 authorizes the user 002 only to reference the data file "Efo."

Furthermore, the data disclosure control computer 16 manages interception of disclosed data from certain member users acting as receiving parties. Interception-related information about the designated member users is managed by creating an information intercepted member table such as that shown in FIG. 5.

As described, the computers and servers configured in the inventive system are consumer-oriented personal computers, which have their assigned functions to implement and which are interconnected via the computer network NT or the like. However, this configuration is not limitative of the invention. Alternatively, the capabilities of the computers and servers constituting the system may be practiced by suitable application programs run on a single information processing apparatus. That is, a single information processing apparatus may be sufficient under appropriate circumstances to implement the data storage unit 11.

(2) Operations of the Data Storage System

How the inventive data storage system operates will now be described with reference to the relevant accompanying drawings. The system allows the same member user to store and use data files, and enables different member users to share disclosed data files. The same users' usage and different users' shared uses of data files involve different system operations, which will be discussed separately.

Described below with reference to FIG. 6 is how the inventive system allows the same member user (e.g., member user A) to stores a data file using a user terminal of one type (e.g., user terminal 1a) and to later access the stored data file using a user terminal of a different type (e.g., user terminal 1b). For this example, it is assumed that the file management computer 13 retains and manages information about member users and about data files stored in the user area 17 beforehand, as shown in the member user management database of FIG. 2A and the member user file management database of FIG. 2B.

The member user A connects the user terminal 1a to the data storage unit 11 of the service provider, or more specifically to the integrated connection interface server 12 constituting part of the data storage unit 11. Upon connection to the system, the member user A enters the appropriate user ID and password or the like for authorization and log-in. On an operation screen provided by the integrated connection interface server 12, the member user A selects a desired data file to be stored from the user terminal 1a into the user area 17, and designates storage of the selected data file into the system in step S1.

The integrated connection interface server 12 receives a data file storage instruction from the member user A in step S1, acquires the data file in question and its attribute information, and instructs the file management computer 13 to store the data file in step S2. In accordance with the instruction issued in step S2 by the integrated connection interface server 12, the file management computer 13 verifies the remaining size of the user area 17 owned by the member user A who initiated the storage instruction and, if the remaining user area 17 is found large enough to accommodate the file, instructs the file server 14 to store the actual data of the data file into the user area 17 in step S3. Following storage of the data file by the file server 14, the member user management database and member user file management database in the file management computer 13 are updated in terms of their relevant items such as the used size and remaining size of the user area 17 as well as the attribute information of the stored data files. With this operation, the selected data file from the member user's terminal 1a is stored and managed in the user area 17 of the inventive system.

Suppose now that a data file stored earlier into the user area 17 in step S3 is desired to be used by a user terminal 1b which, different in type from the user terminal 1a, is also owned by the member user A. In that case, the member user A logs into the system by connecting the user terminal 1b to the integrated connection interface server 12. On the operation screen provided by the integrated connection interface server 12, the member user A selects the stored data file and designates reference to the selected file in step S4.

The integrated connection interface server 12 receives a data file reference instruction from the member user A in step S4, and acquires from the file management computer 13 (in step S5) the attribute information about the data file selected by the member user A. The integrated connection interface server 12 then instructs the data format conversion computer 15 (in step S6) to convert the data file into a data format compatible with the type of the user terminal 1b used by the member user A based on the acquired attribute information about the data file as well as on the data conversion table (shown in FIG. 3) retained in the data format conversion computer 15. The data format conversion computer 15 retrieves the original data file from the file management computer 13, converts the retrieved file into the data format designated by the integrated connection interface server 12 in step S6, and transfers the converted data file to the server 12 in step S7. Given the converted data file, the integrated connection interface sever 12 returns to the user terminal 1b (in step S8) the data file in question in a state conducive to being referenced by the terminal 1b. With this operation, the data file stored earlier by the user terminal 1a is referenced by the user terminal 1b, a different type of terminal, through the system.

Described below with reference to FIG. 7 is how the system of this invention enables different member users (e.g., member users A and B) to share a data file.

The member user A first connects to the integrated connection interface server 12 to log into the system. The user A then selects a data file stored earlier in the user area 17, and selects disclosure of the chosen data file in step S11. With disclosure selected by the member user A for the data file in question, the integrated connection interface server 12 provides a disclosure policy input screen. Onto this screen, the member user A enters necessary information items. More specifically, the member user A may designate and enter: the target member user or users to whom to disclose the data file; authorization or prohibition of a copy of the file into the target users' user area 17; authorization or prohibition of download of the data file to the target users' terminals; disclosure periods for the data file; authorization or prohibition of secondary use of the disclosed file by other users; and authorization or prohibition of data file conversion on the data file. The integrated connection interface server 12 acquires from the file management computer 13 (in step S12) the attribute information about the data file selected by the file management computer 13 for shared disclosure.

The integrated connection interface server 12 then transmits to the data disclosure control computer 16 (in step S13) disclosure policy information determined by the member user A and the attribute information about the data file in question coming from the file management computer 13. Given these kinds of information, the data disclosure control computer 16 generates a disclosure policy management table such as that shown in FIG. 4 for purposes of disclosure policy management.

On the basis of the disclosure policy determined by the member user A, the data disclosure control computer 16 sends (in step S14) a use authorization notice to the target member user B, in this example. The use authorization notice is provided either when the user B logging into the system is presented with an appropriate indication on a suitable reference screen or when e-mail or the like is sent to the target member user B from the system.

Upon receipt of the user authorization notice in step S14 from the data disclosure control computer 16, the member user B determines whether or not to use the disclosed data file. If the member user B chooses to use the disclosed data file, the file in question is added to an available file list made up of the files usable by the user B. If the member user B decides not to use the disclosed data file, that file is not added to the available file list. The member user B may set interception of the disclosed data file from the member user A if so desired. If interception of data file disclosure from a specific disclosing party is designated, the interception-related information is set into an information intercepted member table such as that in FIG. 5 and managed by the data disclosure control computer 16. Once such interception is designated, all subsequently disclosed data files from the disclosing party designated in the information intercepted member table are intercepted, with no use authorization notice furnished in step S14.

If the member user B decides to use the data file disclosed by the member user A, the user B selects the disclosed data file on the operation screen provided by the integrated connection interface server 12 and issues a data file use instruction in step S15. Given the instruction, the integrated connection interface server 12 transmits to the data disclosure control computer 16 (in step 16) the attribute information about the data file whose use has been designated. In turn, the data disclosure control computer 16 presents the member user B with an operation screen (in step S17) based on the attribute information about the data file and on the disclosure policy management table (shown in FIG. 4) held in the computer 16.

When the data file is actually used, the operation screen displays only the operations that can be performed in keeping with the disclosure policy established by the member user A, i.e., the disclosing party. For example, if a copy of the file to the user area 17 is authorized but download of the file to the terminal apparatus is prohibited under the disclosure policy, then a "Copy" button appears operable and a "Download" button inoperable on the operation screen. Once the data file is copied, it can be referenced but not downloaded. If the secondary use of the copied data file is authorized under the disclosure policy, that file may be disclosed in like manner to other member users. Where the secondary use of the disclosed data file is practiced by one member user after another, the initial disclosure policy established by the member user A is inherited for each secondary use of the same file.

Then follow the same operations as in steps S6 and S7 above. That is, the integrated connection interface server 12 instructs the data format conversion computer 15 to convert (in step S18) the data file coming from the file management computer 13 into a data format compatible with the type of the user terminal 1 used by the member user B. The data format conversion computer 15 transfers (in step S19) the converted data file to the integrated connection interface server 12. Given the converted data file, the integrated connection interface sever 12 returns to the user terminal 1 (in step S20) the data file in question in a state conducive to being referenced by the user terminal 1 of the member user B. If data format conversion is not authorized or if there is no need for the conversion, the data file transferred from the file management computer 13 is returned unconverted to the member user B. With this operation, the data file disclosed by the member user A is allowed to be used by other member users through the inventive system.

As described above in detail, the data storage system of this invention allows users' terminal apparatuses to connect with the data storage unit of the service provider independently of the types of the terminal apparatuses being used. The data format converting element of the system converts the stored data in the file storing element into a format compatible with a particular type of the terminal apparatus used by each user for connection to the system. With the stored data converted to a suitable format as needed, each user can use the stored data using a terminal apparatus of a desired type for connection to the system. The inventive system thus allows users to access and utilize stored data in a more flexible manner than before freed from the constraints of access locations or of the types of terminals used for connection to the system.

Furthermore, the inventive system allows not only the user who stored data into the system but also other users to use the stored data using a desired terminal apparatus for connection to the system. The data is converted to the format compatible with the terminal apparatus that happens to be in use. In addition, where suitable use conditions are set for the data stored by a given user in the system, the stored data may be disclosed to other users in ways desired by the user in question. Different member can thus share the disclosed data in a flexible manner regardless of the type of the terminal apparatus used for connection to the system or the location where the connection is established with the system. With their disclosure policies established as needed, disclosing parties can realize what may be termed protected disclosure of their data.

While a preferred embodiment of the invention has been described using specific terms, such description is for illustrative purposes only, and it is to be understood that changes and variations may be made without departing from the spirit or scope of the following claims.

What is claimed is:

1. A data storage system having a plurality of terminal apparatuses of users connected with a data storage unit of a service provider via a computer network, said data storage unit storing data from inside said terminal apparatuses so that the stored data are subsequently used by said users, said data storage unit comprising:
   connecting means for connecting said data storage unit of said service provider with one or more terminal apparatuses associated with each of said users via said computer network independently of types of said terminal apparatuses;
   file storing means for allocating to each one of said users a user area of a predetermined size in which to store data from inside the respective terminal apparatus of a disclosing user;
   file managing means for managing the data being stored in said file storing means;
   data format converting means for automatically determining the type of terminal apparatus of a requesting user that is other than the disclosing user and for performing a data format converting process;
   announcing means for announcing that the data for which use conditions have been set are usable by the users other than said disclosing user who stored data into said file storing means; and
   intercepting means for establishing interception of the announcement from the disclosing user either in response to a request from the requesting user before said announcement, or after said announcement,
   wherein, in response to a use request from the requesting user other than the disclosing user, said data format converting means automatically converts stored data of the disclosing user into a format compatible with the type of the terminal apparatus used by the requesting user for connection to the system, the converted data being used by said terminal apparatus through which said requesting user has sent said use request, and
   wherein the disclosing user can prohibit the automatic conversion of the stored data of the disclosing user into a format compatible with the type of terminal apparatus used by the requesting user.

2. A data storage system according to claim 1, further comprising data disclosure controlling means to enable each disclosing user to manage the use conditions under which the respective stored data in said data storing means are allowed to be used;
   wherein said data disclosure controlling means enables the data for which said use conditions have been set by each disclosing user to be used by requesting users other than the disclosing user who stored the data into said file storing means.

3. A data storage system according to claim 2, wherein said announcing means makes the announcement to a specific user other than said disclosing user who stored the data into said file storing means.

4. A data storage system according to claim 2, further comprising recording means for recording settings of said use conditions and a history of uses by the requesting users of the data for which said use conditions have been set.

5. A data storage system having a plurality of terminal apparatuses of users connected with a data storage unit of a service provider via a computer network, said data storage unit storing data from inside said terminal apparatuses so that the stored data are subsequently used by said users, said data storage unit comprising:
- a connecting device configured to connect said data storage unit of said service provider with one or more terminal apparatuses associated with each of said users via said computer network independently of types of said terminal apparatuses;
- a file storing device configured to allocate to each one of said users a user area of a predetermined size in which to store data from inside the respective terminal apparatus of a disclosing user;
- a file managing device configured to manage the data being stored in said file storing device;
- a data format converting device configured to automatically determine the type of terminal apparatus of a requesting user that is other than the disclosing user and for performing a data format converting process; and
- an announcing device configured to announce that the data for which use conditions have been set are usable by the users other than said disclosing user who stored data into said file storing device; and
- an intercepting device configured to intercept the announcement from the disclosing user either in response to a request from the requesting user before said announcement, or after said announcement,
- wherein, in response to a use request from the requesting user other than the disclosing user, said data format converting means automatically converts stored data of the disclosing user into a format compatible with the type of the terminal apparatus used by the requesting user for connection to the system, the converted data being used by said terminal apparatus through which said requesting user has sent said use request, and
- wherein the disclosing user can prohibit the automatic conversion of the stored data of the disclosing user into a format compatible with the type of terminal apparatus used by the requesting user.

6. A data storage method for a plurality of terminal apparatuses of users connected with a data storage unit of a service provider via a computer network, said data storage unit storing data from inside said terminal apparatuses so that the stored data are subsequently used by said users, said data storage method comprising:
- connecting said data storage unit of said service provider with one or more terminal apparatuses associated with each of said users via said computer network independently of types of said terminal apparatuses;
- allocating to each one of said users a user area of a predetermined size in which to store data from inside the respective terminal apparatus of a disclosing user;
- managing the data being stored in each of the allocated user areas; and
- automatically determining the type of terminal apparatus of a requesting user that is other than the disclosing user and for performing a data format converting process; and
- announcing that the data for which use conditions have been set are usable by the users other than said disclosing user who stored data; and
- intercepting the announcement from the disclosing user either in response to a request from the requesting user before said announcement, or after said announcement,
- wherein, in response to a use request from the requesting user other than the disclosing user, said data format converting process automatically converts stored data of the disclosing user into a format compatible with the type of the terminal apparatus used by the requesting user for connection to the system, the converted data being used by said terminal apparatus through which said requesting user has sent said use request, and
- wherein the disclosing user can prohibit the automatic conversion of the stored data of the disclosing user into a format compatible with the type of terminal apparatus used by the requesting user.

* * * * *